(12) United States Patent
Matson et al.

(10) Patent No.: US 11,046,340 B2
(45) Date of Patent: *Jun. 29, 2021

(54) VEGETATION DETECTION AND ALERT SYSTEM FOR A RAILWAY VEHICLE

(71) Applicant: Bayer CropScience LP, Research Triangle Park, NC (US)

(72) Inventors: Kris Matson, Cary, NC (US); Pascal Day, Lyons (FR); Lloyd Hinnant, Cary, NC (US); Alvaro Ortiz Fernandez, Barcelona (ES); Eduardo Back, Research Triangle Park, NC (US); Jonathon Brent Slone, Cary, NC (US)

(73) Assignee: Bayer CropScience LP, St. Louis, MO (US)

( * ) Notice: Subject to any disclaimer, the term of this patent is extended or adjusted under 35 U.S.C. 154(b) by 117 days.

This patent is subject to a terminal disclaimer.

(21) Appl. No.: 16/454,840

(22) Filed: Jun. 27, 2019

(65) Prior Publication Data

US 2019/0367059 A1 Dec. 5, 2019

Related U.S. Application Data

(63) Continuation of application No. 16/166,945, filed on Oct. 22, 2018, now Pat. No. 10,370,014, which is a continuation of application No. 15/952,604, filed on Apr. 13, 2018, now abandoned.

(60) Provisional application No. 62/485,678, filed on Apr. 14, 2017.

(51) Int. Cl.
*B61L 23/04* (2006.01)
*B61L 25/02* (2006.01)
*G06T 17/05* (2011.01)
*G06K 9/00* (2006.01)

(52) U.S. Cl.
CPC .......... *B61L 23/041* (2013.01); *B61L 25/025* (2013.01); *G06K 9/00657* (2013.01); *G06T 17/05* (2013.01); *B61L 2205/04* (2013.01)

(58) Field of Classification Search
CPC .......... B61L 15/00; B61L 23/00; B61L 23/04; B61L 27/00; G06K 9/60; G06K 9/62
See application file for complete search history.

(56) References Cited

U.S. PATENT DOCUMENTS

| | | | |
|---|---|---|---|
| 7,046,841 B1 | 5/2006 | Dow et al. | |
| 8,275,547 B2 | 9/2012 | Rousselle et al. | |
| 8,352,410 B2 | 1/2013 | Rousselle et al. | |
| 8,625,878 B2 | 1/2014 | Haas et al. | |
| 8,680,994 B2 | 3/2014 | Leppanen et al. | |
| 9,919,723 B2 | 3/2018 | Bhagwatkar et al. | |
| 10,370,014 B2 * | 8/2019 | Matson | B61L 23/041 |
| 2016/0221592 A1 | 8/2016 | Puttagunta et al. | |

(Continued)

FOREIGN PATENT DOCUMENTS

| | | |
|---|---|---|
| EP | 1682852 A1 | 7/2006 |
| WO | 9917606 A1 | 4/1999 |
| WO | 2005047819 A1 | 5/2005 |

(Continued)

*Primary Examiner* — Robert J McCarry, Jr.
(74) *Attorney, Agent, or Firm* — McBee Moore & Vanik IP, LLC

(57) ABSTRACT

The present disclosure relates generally to vegetation detection and, in particular, to a vegetation detection and alert system for a railway vehicle.

11 Claims, 12 Drawing Sheets

(56) References Cited

U.S. PATENT DOCUMENTS

2017/0066459 A1    3/2017  Singh

FOREIGN PATENT DOCUMENTS

| WO | 2016042320 A1 | 3/2016 |
| WO | 2016118672 A2 | 7/2016 |
| WO | 2017021753 A1 | 2/2017 |

* cited by examiner

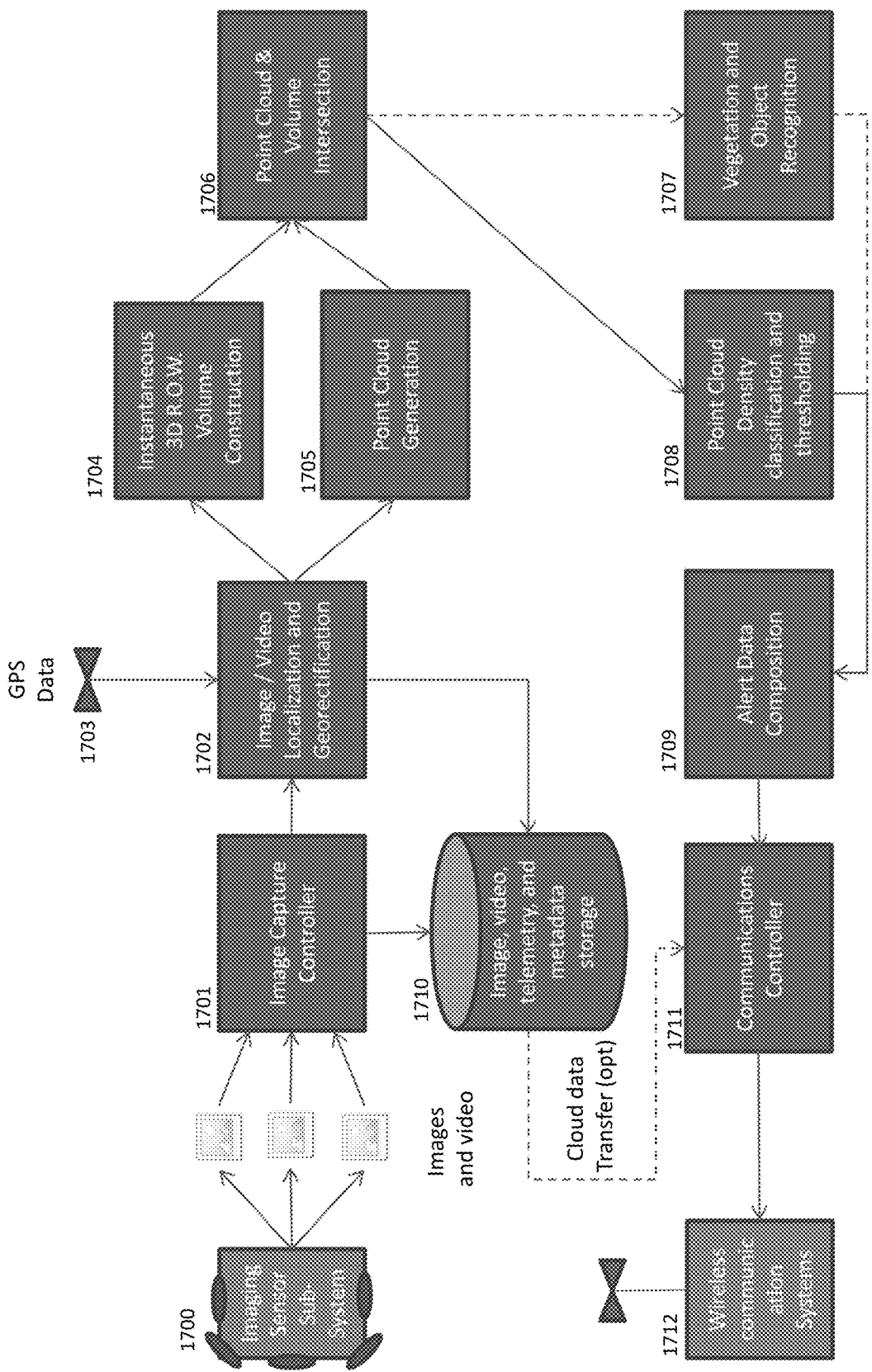
Fig. 17 Algorithm Flow Chart

VEGETATION DETECTION AND ALERT SYSTEM FOR A RAILWAY VEHICLE

CROSS REFERENCE TO RELATED APPLICATION

This application is a Continuation of U.S. application Ser. No. 16/166,945, filed 22 Oct. 2018, which is a Continuation of U.S. application Ser. No. 15/952,604, filed Apr. 13, 2018, which claims the benefit of U.S. Provisional Application Ser. No. 62/485,678, filed Apr. 14, 2017, the contents of which are herein incorporated by reference in their entirety.

TECHNOLOGICAL FIELD

The present disclosure relates generally to vegetation detection and, in particular, to a vegetation detection and alert system for a railway vehicle.

BACKGROUND

Railroads spend a significant amount of time and resources to control vegetation around railroad tracks. Vegetation control provides a number of benefits to railroad tracks and railroad operation. Vegetation control improves sight distance for visibility of trains and at railroad crossings to avoid hazards at intersections. Vegetation control maintains a clearance zone for railroad right-of-ways and improves sight distance and safety along track segments between crossings. Vegetation control also provides proper drainage around tracks and reduces damage to signal and communication lines on tracks. In a number of jurisdictions, vegetation control is required by law.

Railroad companies employ in-house and third-party vegetation control inspectors and engineers who implement vegetation control programs, notably within track and right-of-way clearance zones. These programs are very time and resource consuming, and are difficult to implement and keep up. Therefore it would be desirable to have systems and methods that take into account at least some of these issues discussed above, as well as other possible issues.

BRIEF SUMMARY

In view of the foregoing background, example implementations of the present disclosure are directed to a vegetation detection and alert system for a railway vehicle, including in more particular examples, detection of vegetation obstructing or at-risk of obstructing a clearance zone around the railroad track. The present disclosure thus includes, without limitation, the following example implementations.

Some example implementations provide an acquisition device mountable to a railway vehicle for detecting vegetation, the acquisition device comprising an imaging sensor configured to capture images of an environment of the railway vehicle and tracks including but not limited to a clearance zone around a railroad track on which the railway vehicle moves, the imaging sensor being configured to capture the images from the railway vehicle as the railway vehicle moves on the railroad track; a geospatial position sensor configured to determine a geolocation of the geospatial position sensor and thereby the environment imaged by the imaging sensor; and a processor coupled to the imaging sensor and geospatial position sensor, and programmed to at least: reference the images captured by the imaging sensor to the geolocation determined by the geospatial position sensor to form geospatial images of the environment including the clearance zone; and for one or more geospatial images of the geospatial images, process the one or more geospatial images to produce a geometric computer model of the environment in which objects in the environment are represented by a collection of geometry; detect vegetation in the clearance zone based on the geometric computer model; and upload the one or more geospatial images and a notification of detected vegetation from which the device or a backend server is configured to generate an alert for one or more client systems.

Some example implementations provide a method comprising detecting vegetation using an acquisition device mountable to a railway vehicle, the acquisition device including an imaging sensor and a geospatial position sensor, the method comprising capturing, by the imaging sensor, images of an environment of the railway vehicle including a clearance zone around a railroad track on which a railway vehicle moves, the imaging sensor capturing the images from the railway vehicle as the railway vehicle moves on the railroad track; determining, by the geospatial position sensor, a geolocation of the geospatial position sensor and thereby the environment imaged by the imaging sensor; referencing the images captured by the imaging sensor to the geolocation determined by the geospatial position sensor to form geospatial images of the environment including the clearance zone; and for one or more geospatial images of the geospatial images, processing the one or more geospatial images to produce a geometric computer model of the environment in which objects in the environment are represented by a collection of geometry; detecting vegetation in the clearance zone based on the geometric computer model; and uploading the one or more geospatial image and a notification of detected vegetation from which a backend server is configured to generate an alert for a client.

Features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

BRIEF DESCRIPTION OF THE DRAWING(S)

Having thus described the disclosure in general terms, reference will now be made to the accompanying drawings, which are not necessarily drawn to scale, and wherein:

FIG. 17 illustrates a suitable algorithm flowchart of the system and method described herein.

DETAILED DESCRIPTION

Figure 1:
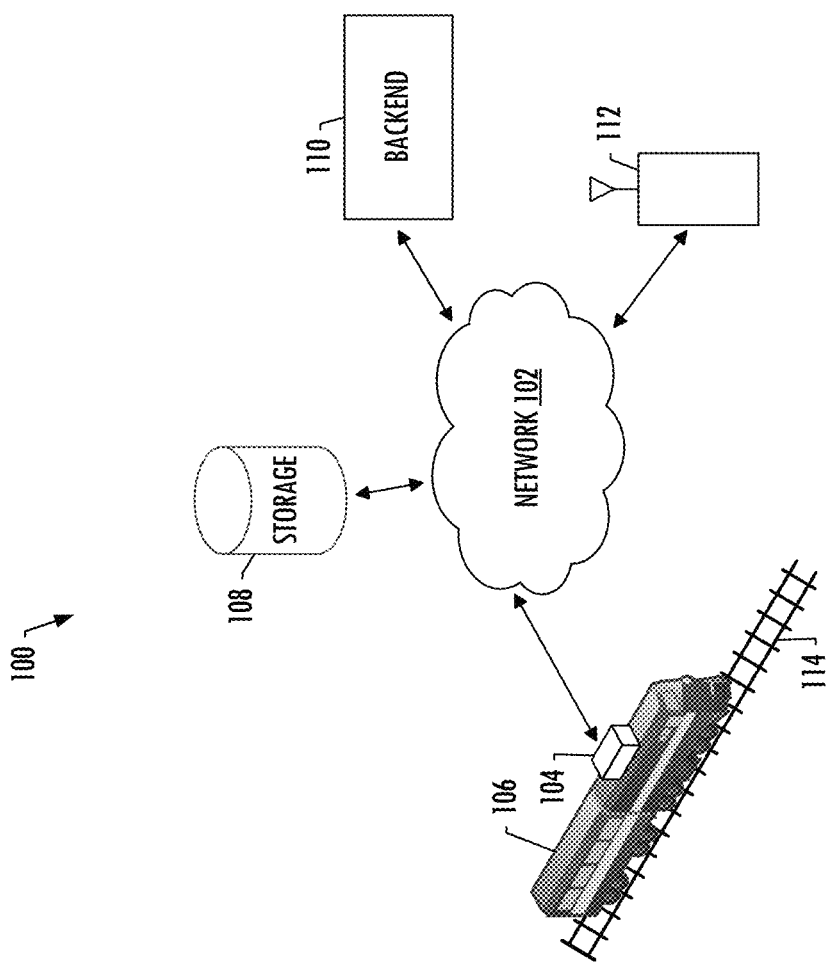
FIG. 1 illustrates a vegetation detection and alert system for a railway vehicle, according to example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. As used herein, for example, the singular forms "a," "an," "the" and the like include plural referents unless the context clearly dictates otherwise. The terms "data," "information," "content" and similar terms may be used interchangeably, according to some example implementations of the present invention, to refer to data capable of being transmitted, received, operated on, and/or stored. Also, for example, reference may be made herein to quantitative measures, values, relationships or the like. Unless otherwise stated, any one or more if not all of these may be absolute or approximate to account for acceptable variations that may occur, such as those due to engineering tolerances or the like. Like reference numerals refer to like elements throughout.

FIG. 1 illustrates a vegetation detection and alert system 100 for a railway vehicle (at times simply referred to as the system). As shown, the system may be implemented with an Internet-based computing architecture including a computer network or a number of interconnected computer networks 102 in or over which a number of systems, (optionally including a back end), computers and the like communicate or otherwise operate. As shown, these include an acquisition device 104 onboard a railway vehicle 106, and a cloud storage 108, backend server 110 and client 112. Although shown and described herein in the context of an Internet-based computing architecture, it should be understood that the system may implemented with any of a number of different network-based architectures including implementation as a stand-alone system connected or disconnected from a computer network.

The network 102 may be implemented as one or more wired networks, wireless networks or some combination of wired and wireless networks. The network may include private, public, academic, business or government networks, or any of a number of different combinations thereof, and in the context of an Internet-based computing architecture, includes the Internet. The network may support one or more of any of a number of different communications protocols, technologies or the like, such as cellular telephone, Wi-Fi, satellite, cable, digital subscriber line (DSL), fiber optics and the like.

The systems and computers connected to the network 102 may also be implemented in a number of different manners. The acquisition device 104 is a special-purpose computer and sensing system configured to acquire, generate and process geospatially localized images of an environment of the railway vehicle 106 including a clearance zone around a railroad track 114 on which the railway vehicle moves. The railway vehicle is any of a number of different vehicles designed to run on railroad track. Examples of suitable railway vehicles include locomotives, railroad cars hauled by locomotives (forming trains), track maintenance vehicles, trucks designed to run on either tracks or roadways, and the like.

Figure 2A:
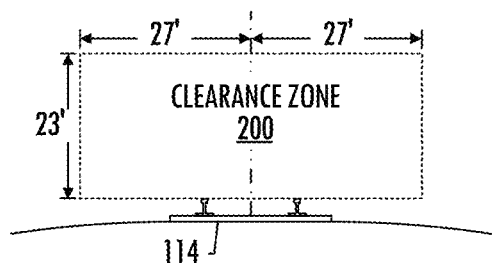
FIGS. 2A and 2B illustrate forward and top views of a clearance zone around various sections of railroad track, according to some example implementations.
Figure 2B:
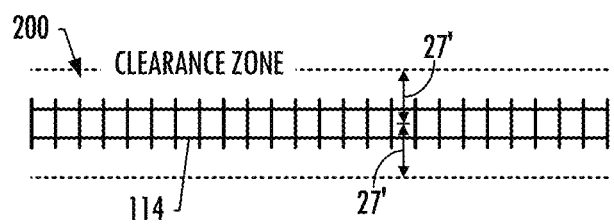
Figure 2C:
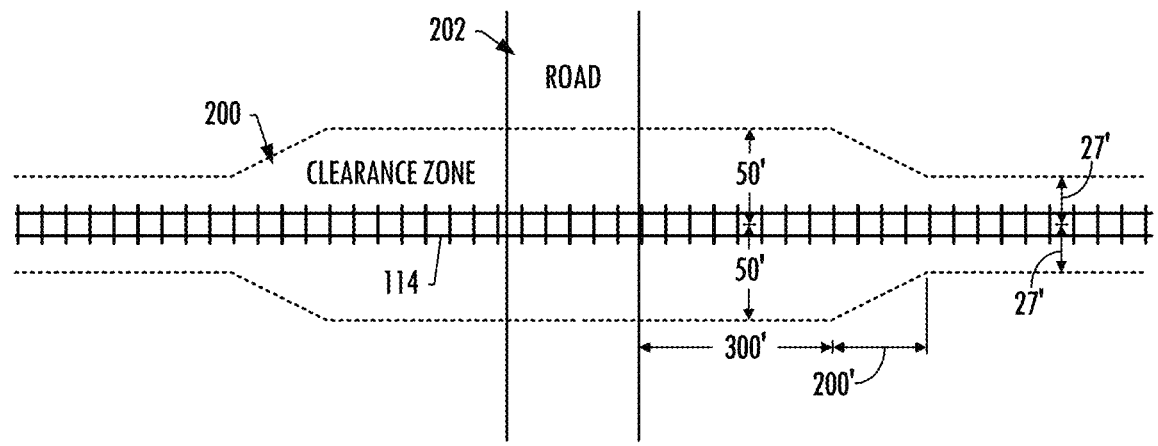
FIGS. 2C and 2D illustrate top views of the clearance zone for other sections of railroad track, according to some example implementations.
Figure 2D:
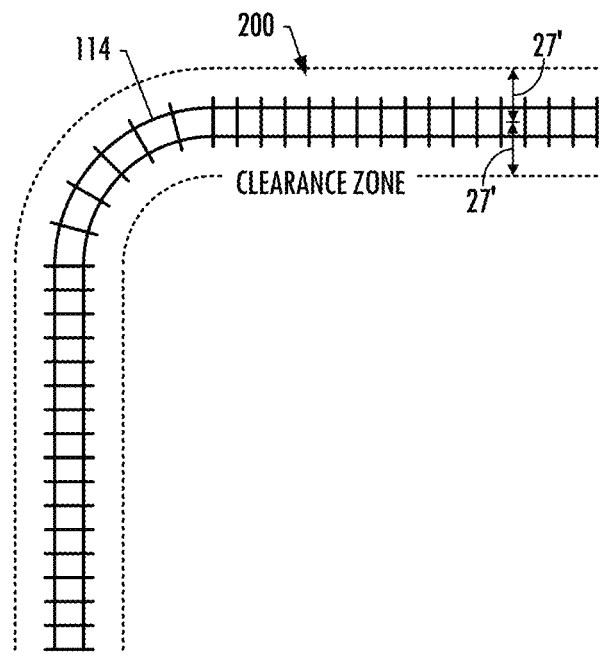

The clearance zone is a three-dimensional zone defined from the railroad track 114, extending a distance on either side of the centerline of the track, and a distance above the track. FIGS. 2A and 2B illustrate forward and top views of a clearance zone 200 around a straight section of railroad track, according to some example implementations. FIGS. 2C and 2D illustrate top views of the clearance zone for other sections of railroad track, according to some example implementations.

As shown in FIGS. 2A and 2B, the clearance zone 200 extends some default horizontal distance (e.g., twenty-seven feet) on either side of the centerline of the track 114, and some default vertical distance (e.g., twenty-three feet) above the track. At railroad crossings, as shown in FIG. 2C, the clearance zone extends a greater horizontal distance (e.g., fifty feet) on either side of the centerline of the track in the vicinity of the intersection. This is shown at the intersection where the railroad track crosses a road 202. As also shown in FIG. 2C, the clearance zone gradually changes between these distances as the track approaches the crossing, extends through the crossing, and then gradually changes back as the track clears the crossing. FIG. 2D illustrates the clearance zone around a curved section of railroad track. The distances shown in FIGS. 2A, 2B, 2C and 2D are by example and should not be taken to limit the scope of the present disclosure.

Referring back to FIG. 1. according to example implementations, the acquisition device 104 includes one or more of each of a number of components including an imaging sensor and a geospatial positioning sensor that cooperate to generate geospatially localized images of the environment of the railway vehicle 106 including the clearance zone around the railroad track 114. The imaging sensor (or in some examples a plurality of imaging sensors) is generally configured to capture images of the environment, and the geospatial positioning sensor is generally configured to contribute to determining the localization of the sensor in geographic space and thereby localization of the environment imaged by the imaging sensors. Using computer vision techniques for object detection and measurement, along with the geospatial positioning information, the images are referenced to a geolocation and thereby constitute geospatially referenced images. That is, each geospatial image is an image of an environment accurately referenced to, or localized in, the geolocation of the environment. It should be understood that the GPS sensor will contribute to, but does not necessarily have to be the sensor or if used, even the exclusive source of localization of images, and therefore a 3D model derived therefrom. A track positioning derived from the images using for example, any suitable computer vision technique as known in the art, can be used together with GPS and/or alone.

In some examples, the acquisition device 104 is configured to process the geospatial images to model the environment including the clearance zone. The geospatial images may be processed to produce a three-dimensional geometric computer model of the environment in which objects in the environment including the clearance zone are represented by a collection of geometry and images. The acquisition device may produce the geometric computer model of the environment in any of a number of different manners.

In some examples, the image of the environment is a point cloud of points on the surfaces of objects in the environment, and the geometric computer model is produced from the point cloud. The acquisition device 104 may use commercially-available, open-source or custom-developed tools for this purpose, such as the image processing and analysis tools of OpenCV, KWIVER Map-Tk, and OpenMVG. One example of a suitable computer model is a three-dimensional digital point cloud model of the environment including the clearance zone. The computer model of the environment is also referenced to the environment's geolocation and thereby constitutes a geospatially localized (or geospatially-referenced), geometric computer model.

In some examples, the acquisition device 104 is configured to detect vegetation in the environment including vegetation obstructing or at-risk of obstructing the clearance zone based on the geometric computer model. The acquisition device may accomplish this in a number of different manners, such as by recognition of known vegetation geometry in the geometric computer model and by recognition of optical signatures in the images corresponding to the geometric computer model. In some examples, the acquisition device may further detect the type of vegetation based on known types with distinguishable geometry, alone or perhaps with other information such as spectral information acquired from or coextensive with the imaging sensors. The acquisition device may use a number of different techniques to detect vegetation. Examples of suitable techniques include artificial intelligence (AI) techniques such as machine learning and computer vision.

The acquisition device 104 may generate and process geospatially localized images of the environment of the railway vehicle 106 including the clearance zone around the railroad track 114 in real-time or near real-time as the railway vehicle moves, each image and corresponding geometric computer model covering a respective portion of the clearance zone along the railroad track. The images in some examples may be frames of video captured by the acquisition device. In some examples, the acquisition device records at least some of the acquired information including at least some of the images, geometric computer models and detected vegetation in onboard storage.

In some examples, as or after the localized images are processed, the acquisition device 104 is configured to upload at least some of the acquired information to the storage 108. This may in some examples include the acquisition device uploading at least the geospatial images and notifications of detected vegetation, the notifications in some examples including the corresponding geometric computer models in which vegetation is detected. In these examples, the detected vegetation may be recorded and/or uploaded in a number of different manners, from a simple notification to identification of the vegetation geometry in the geometric computer model, which may be extracted from the localized images and laid over the geometric computer model.

The storage 108 is any of a number of different devices configured to receive and store at least some of the geospatial images and perhaps other output of the acquisition device 104. One example of suitable storage is cloud storage composed of physical storage across a plurality of server computers. Other examples of suitable storage include file storage, database storage and the like.

The backend server 110 is configured to access the storage 108 and generate alerts for detected vegetation, which are then delivered to the client 112. In some examples, the backend server more actively participates in geometric model generation and vegetation detection. In these examples, the acquisition device 104 may generate and upload the geospatial images to the storage, and the backend server may process the images to detect vegetation, such as in a manner the same as or similar to that described above for the acquisition device. More particularly, for example, the backend server may process the geospatially referenced images to produce a geometric computer model localized in the environment, and detect vegetation in the clearance zone based on the geometric computer model, as described above.

The backend server 110 is commonly implemented as a server computer although other implementations are contemplated (e.g., mainframe computer, personal computer). The client 112 is generally hardware or software configured to receive or access a service on the backend server or acquisition device 104. In some examples, the client is a fixed or mobile computing device such as a desktop computer, portable computer (e.g., laptop computer, tablet computer), mobile phone (e.g., smartphone, cellular phone), wearable computer (e.g., smartwatch, optical head-mounted display) or the like. The backend server may be embodied as one or more servers, a network of interworking computing devices (e.g., a distributed computer implemented by multiple computers) or the like. In implementations in which the backend server is implemented as a distributed computer, its multiple computers may communicate over a network such as network 102.

An alert generated by the backend server 110 and delivered to the client 112 may be as simple as a notification that identifies the geolocation along the railroad track 114 at which the acquisition device 104 detected vegetation within the clearance zone. Other relevant information may also be provided. The alert may indicate the type of vegetation. The alert may provide an alert rating for the detected vegetation based on its proximity to the railroad track, such as in order of closest proximity, "severe," "high" or "moderate."

Figure 3:
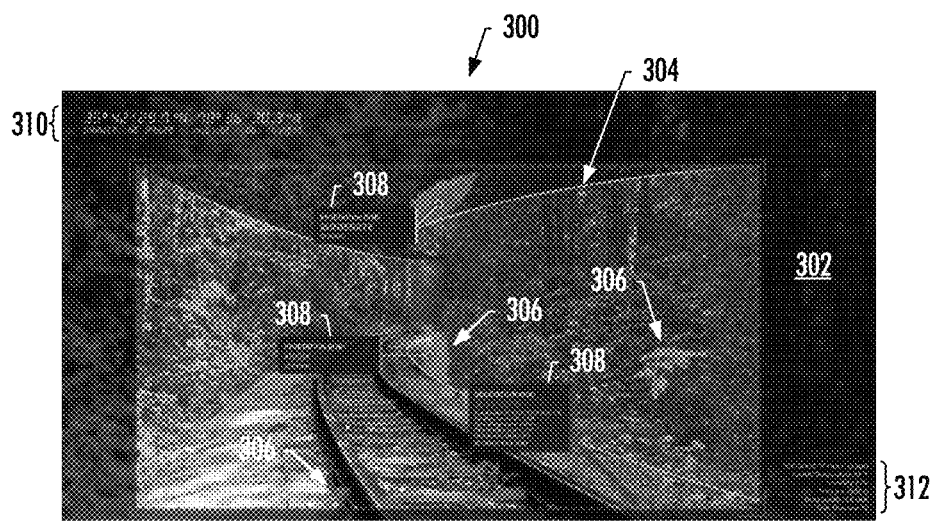
FIGS. 3, 4 and 5-14 are composite images that may be generated according to some example implementations.
Figure 4:
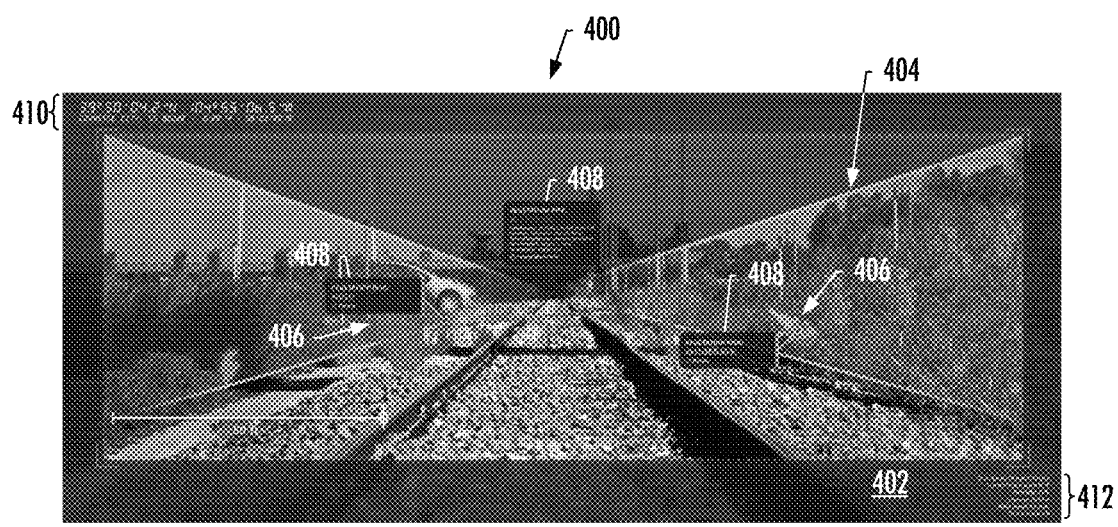
Figure 5:
Figure 6:
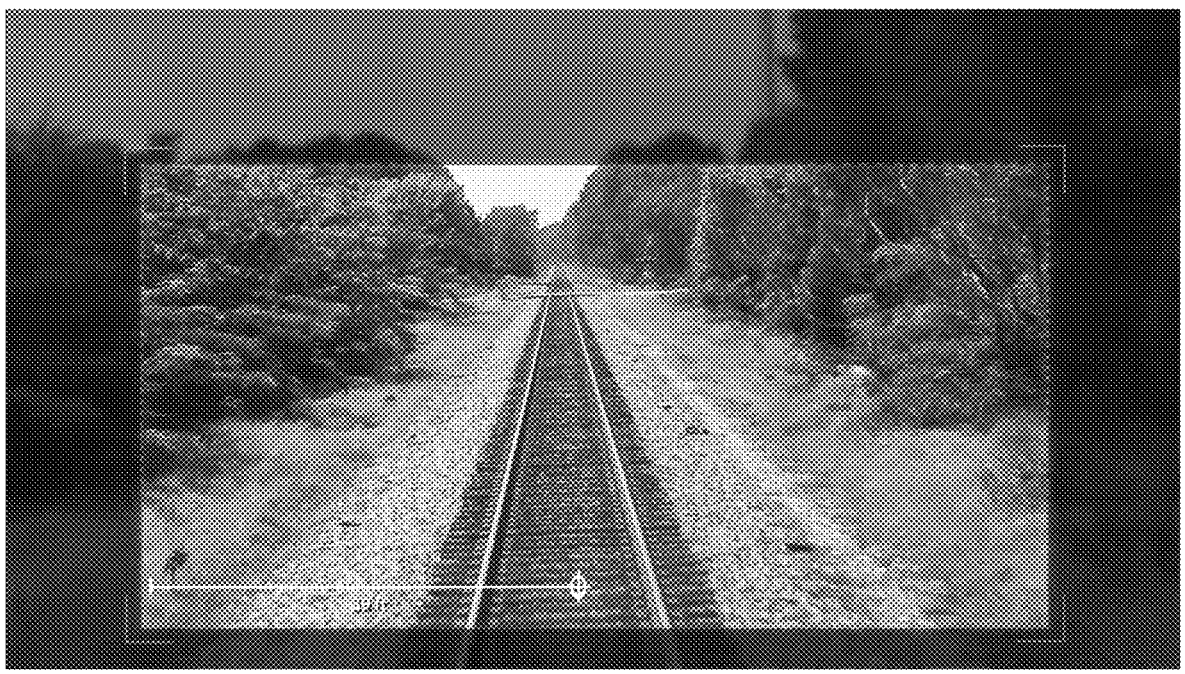
Figure 7:

As shown in FIGS. 3 and 4, in some examples, an alert may include a composite image 300, 400. The composite image includes the geospatial image 302, 402 that depicts the detected vegetation, with an overlay of the clearance zone 304, 404. As shown, the geospatial image covers more than the clearance zone, and the portion outside the clearance zone is blurred to highlight the portion within the clearance zone with greater detail.

As also shown, the composite image 300, 400 includes an overlay of the geometry 306, 406 of the detected vegetation from the geometric model, which may be color-coded for the alert rating of the detected vegetation. Even further, the composite image includes callouts 308, 408 with information regarding the detected vegetation, such as their alert rating, geolocation, type and/or detected date. The composite image may also identify the distance of the clearance zone from the center of the track, and include more general information 310, 410 such as the geolocation for the environment depicted in the image. Even further information 312, 412 may include various information for the railway vehicle 106 and environment when the image was captured, such as the vehicle's speed and direction, and the environmental temperature, humidity, pressure, wind speed and the like.

Figure 8:
Figure 9:
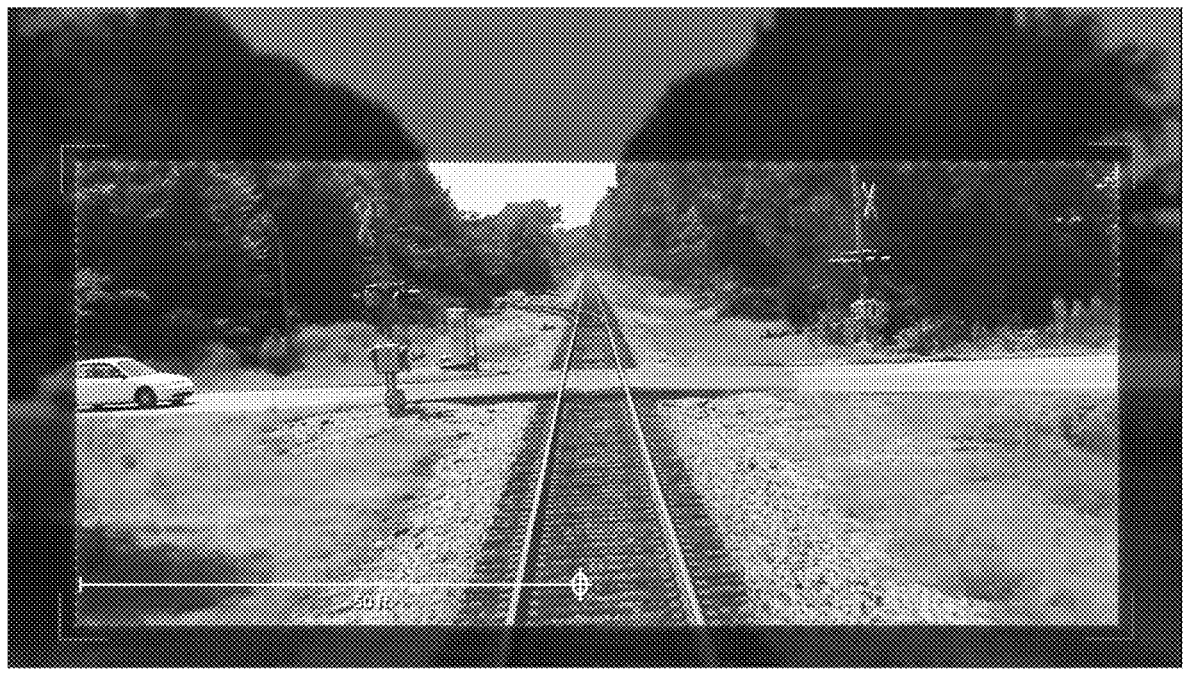
Figure 10:
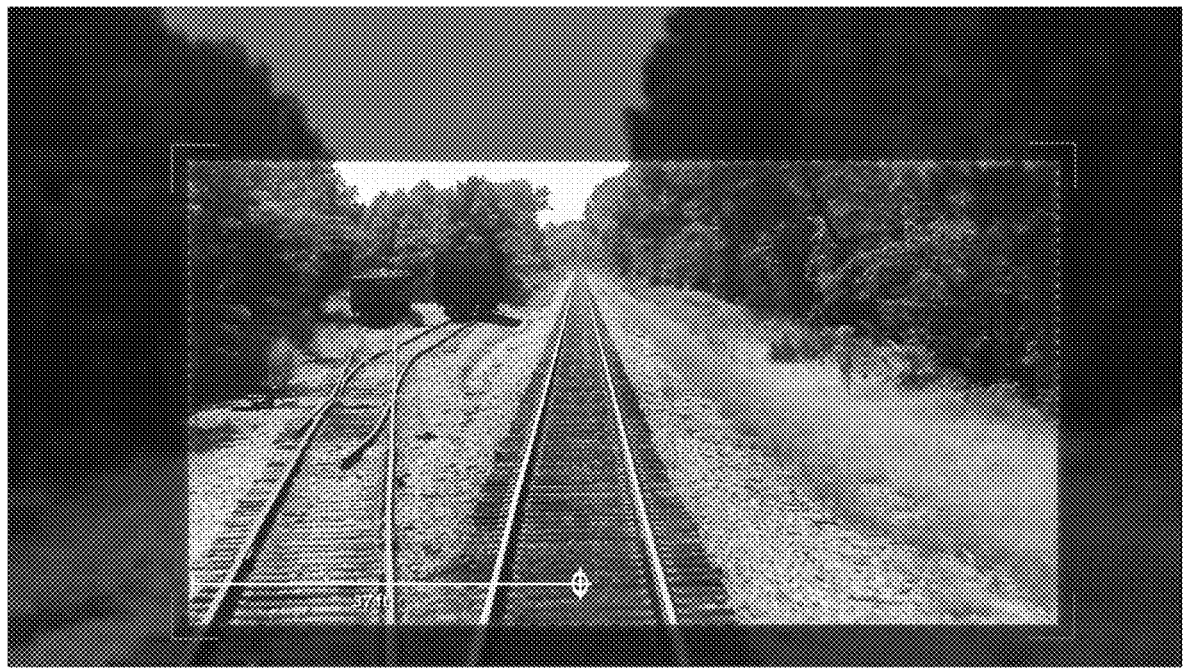
Figure 11:
Figure 12:
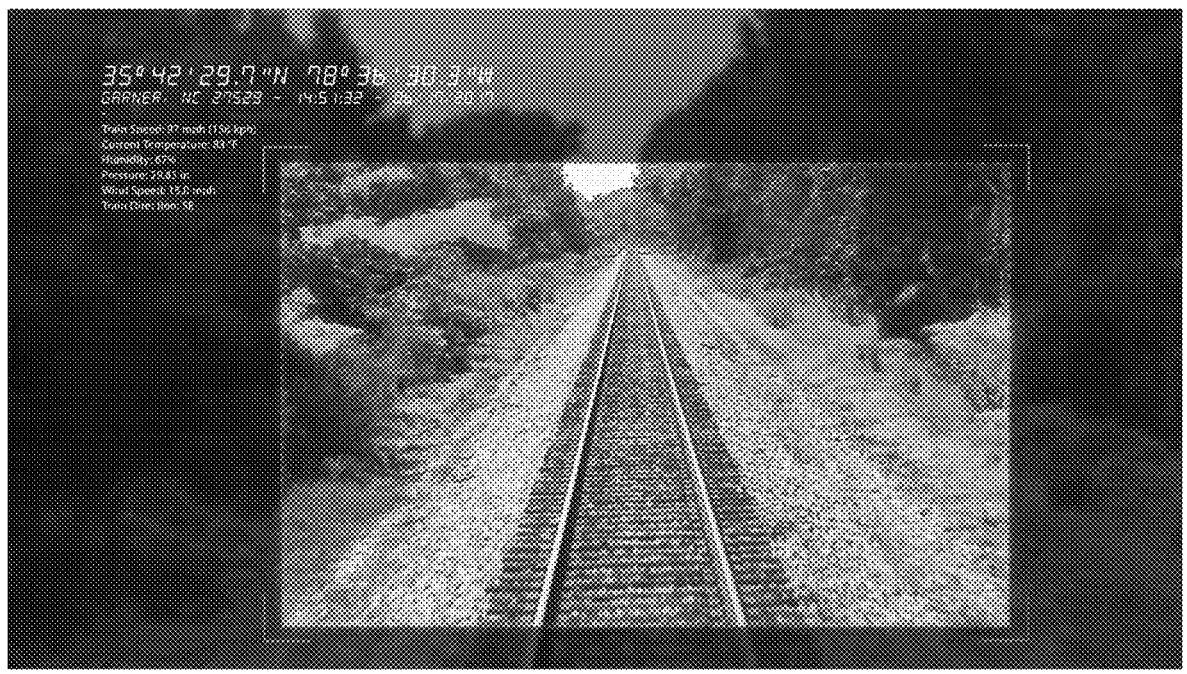
Figure 13:
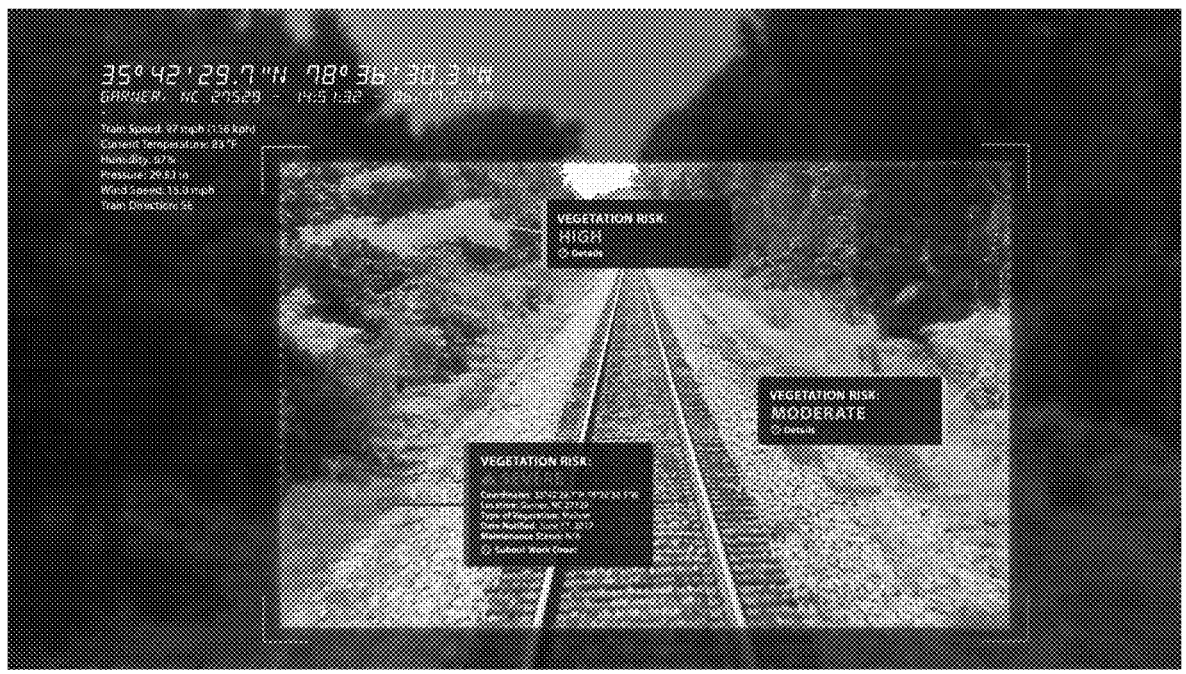
Figure 14:
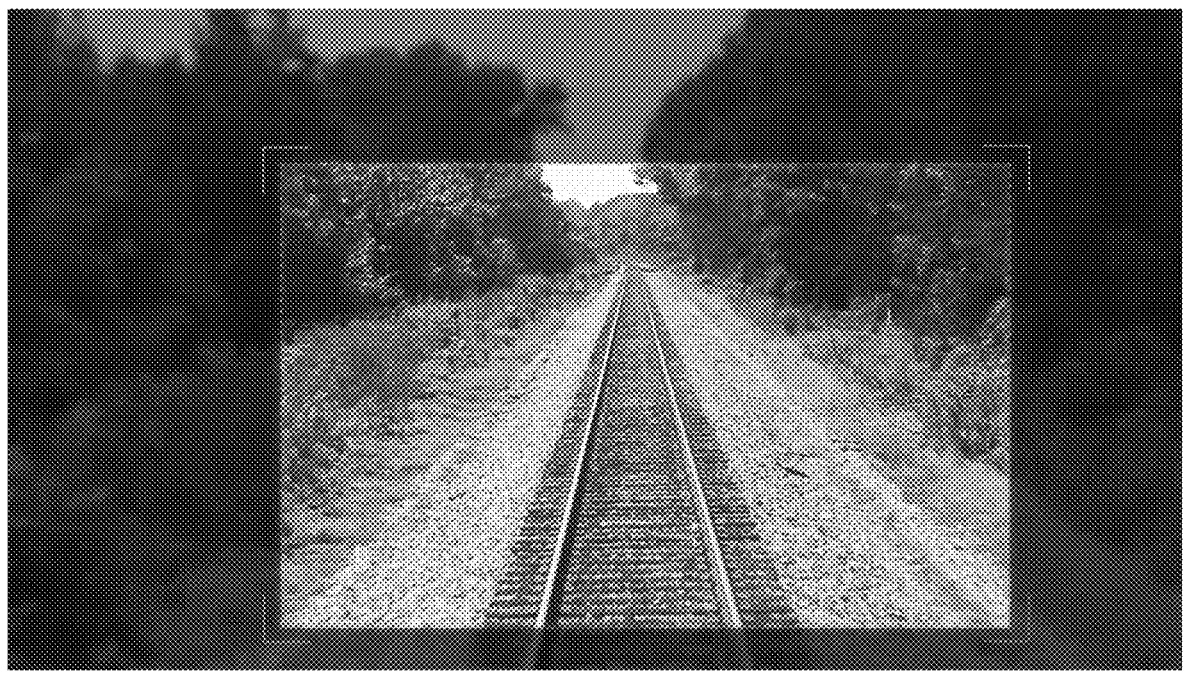

FIGS. 5-14 illustrate a sequence of composite images covering movement of a railway vehicle up to and passing a crossing. FIGS. 8, 12 and 13 illustrate images in which vegetation within the clearance zone is detected.

According to example implementations of the present disclosure, the system 100 and its subsystems including the acquisition device 104, cloud storage 108, backend server 110 and client 112 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 15:
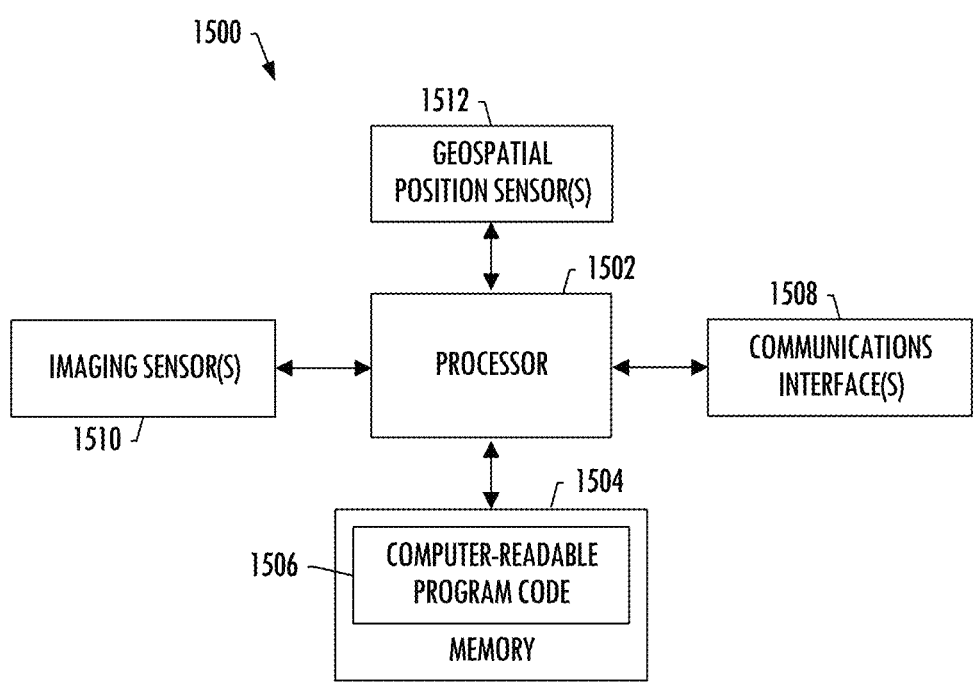
FIGS. 15 and 16 illustrate apparatuses according to example implementations.
Figure 16:
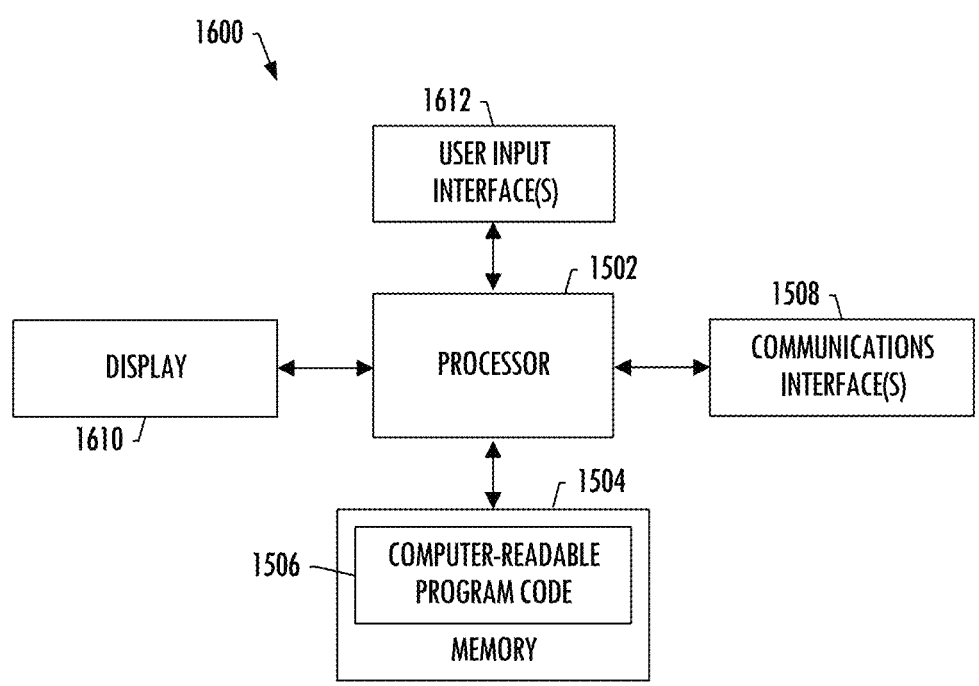

FIG. 15 illustrates an apparatus 1500 configured to implement the acquisition device 112 according to some example implementations of the present disclosure. FIG. 16 illustrates a similar apparatus 1600 that may be configured to implement the backend server 110 or client 112. Generally, an apparatus of exemplary implementations of the present disclosure may comprise, include or be embodied in one or more fixed or portable electronic devices. The apparatus may include one or more of each of a number of components such as, for example, a processor 1502 connected to a memory 1504 (e.g., storage device).

The processor 1502 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 1504 (of the same or another apparatus).

The processor 1502 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs, GPUs or the like, such as Nvidia Drive Platform. Thus, although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

The memory 1504 is generally any piece of fixed or removable computer hardware that is capable of storing information such as, for example, data, computer programs (e.g., computer-readable program code 1506) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1504, the processor 1502 may also be connected to one or more communication interfaces 1508. The communications interface(s) may be configured to transmit and/or receive information, such as to and/or from other apparatus(es), network(s) or the like. The communications interface may be configured to transmit and/or receive information by physical (wired) and/or wireless communications links to a network (e.g., network 102) using technologies such as cellular telephone, Wi-Fi, satellite, cable, DSL, fiber optics or the like.

As shown for the apparatus 1500 configured to implement the acquisition device 112, the processor 1502 may also be connected to one or more sensors such as one or more imaging sensors 1510 and one or more geospatial positioning sensors 1512. As described above, the imaging sensor is generally configured to capture images of the environment, the geospatial positioning sensor is generally configured to contribute to determining the geolocation of the sensor, and/or computer vision algorithms are employed in combination with the geo-positioning information to localize the environment imaged by the imaging sensor. Optimally both GPS and computer vision are both utilized in order to create instantiation of the capability for the most accurate localization. Examples of suitable imaging sensors include digital cameras, infrared cameras, thermal cameras, depth-aware or range cameras, stereo cameras, light detection and ranging (LIDAR) sensors, radio detection and ranging (RADAR) sensors and the like. Examples of suitable geospatial positioning sensors include satellite-navigation system sensors (e.g., GPS, GLONASS, BeiDou-2, Galileo), inertial navigation system (INS) sensors and the like.

The apparatus 1500, 1600 may additionally include one or more user interfaces, as shown in particular in FIG. 16 for the apparatus configured to implement the backend server 110 or client 112. The user interfaces may include a display 1610 and/or one or more user input interfaces 1612. The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen) or the like. The user interfaces may further include one or more interfaces for communicating with peripherals such as printers, scanners or the like.

As indicated above, program code instructions may be stored in memory, and executed by a processor that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by processor, or storage of instructions in a computer-readable storage medium, supports combinations of operations for performing the specified functions. In this manner, an apparatus 1500, 1600 may include processor 1502 and a computer-readable storage medium or memory 1504 coupled to the processor, where the processor is configured to execute computer-readable program code 1506 stored in the memory. It will also be understood that one or more functions, and combinations of functions, may be implemented by special purpose hardware-based computer systems and/or processor which perform the specified functions, or combinations of special purpose hardware and program code instructions.

According to one exemplary embodiment, the algorithm flowchart, FIG. 17, identifies a logical path of data processing and execution flow from the start of the system, the imaging systems 1700 (one or more of the same type or different type of imaging sensor, as described above) recording image sequences, and the end of the example implementation, the wireless communication systems 1712. As stated above the entire system will be a portable unit or series of units that can be moved from rail vehicle to rail vehicle, as needed.

Raw images and video data are gathered as input from the imaging sensor sub-system 1700 and transmitted to the image capture controller 1701. The image capture controller sets the sensor capture rates and compression processing for the image sensors. The controller ensures multiple images are captured simultaneously so that the set of images can be optimally used to reconstruct the geometry of the environment at the time of capture. This provides the ability for downstream processing to accurately georeference the images and to create and localize 3-dimensional digital representations of the rail vehicle's environment as it moves along the rail path. The image capture controller then transmits data to both a storage medium 1710 and downstream for further data processing in the image/video localization and georectification process 1702.

As part of the storage medium 1710, images, video and associated telemetry and metadata are stored in a queue onboard the device for a configurable duration of time. If additional storage is needed, the data may be offloaded from the local storage to other storage media or over wireless by the communications controller and progressively removed from the short-term memory or data storage.

The image/video localization and georectification process 1702 acquires data from the geospatial positioning sensors (GPS) 1703 and the image capture controller 1701, binding the GPS data to each image and video frame. Image georectification and localization may utilize computer vision techniques and methods such as, for example, stereo photogrammetry, simultaneous location and mapping, automatic feature identification and tracking, 3-dimensional pose estimation, and machine learning algorithms.

Using each overlapping simultaneously collected image, and the known dimensions and placement of each pixel in the images, the railroad tracks are identified using computer vision techniques and then used to localize the instantaneous image set. The multiple sequential images, the fixed image parameters, the GPS location, and the known geometry of the rails and the ground plane in the images, are photogrammetrically combined to yield a highly accurate mapping of the image pixels and geometry to the environment of the railroad right of way. This processing step maps every image or video pixel to a geospatial coordinate space, so that the images can be used for accurate mensuration of the right-of-way (R.O.W.) or clearance zone volume and measurement of objects inside of or intersecting the right of way volume.

From the detailed track localization and image geometry, a 3D volumetric model of the right-of-way is created for the instant in time of image capture. The volume is most accurate around the image acquisition device and extends a limited distance fore and aft of the device. Consecutively captured image sets are used to construct consecutive, time-sliced volumes that are joined together to create an accurate right-of-way volume around the track and along the rail bed.

In parallel with the 3D photogrammetric volume construction 1704 step above, a point cloud of object surfaces in the images is generated 1705 using multiple image time slices. Standard computer vision and photogrammetric techniques are used to build the point cloud around the right-of-way.

Subsequent to point cloud 1705 and right of way volume generation 1704, the point cloud is intersected with the volume 1706 to classify those points inside the 3D volume. These points represent objects including vegetation that are inside the right of way. The density and distances within the point cloud indicate the relative size of the objects and vegetation inside the right-of-way.

In an optional processing step, the imagery, point cloud, and volume are joined in a machine learning algorithm to identify the types (classes) of objects intruding into the 3D right of way volume. This step is not essential for alert generation 1709, but may be useful for further discrimination on the level of risk and the nature of the mitigation that will need to be applied.

The point cloud density classification and thresholding processing step 1708 classifies the density and intrusion distance of objects in the volume to determine a severity level for the intrusion. The severity and number of levels is user-configurable. This provides the capability to determine vegetation encroachment into the clearance zone.

Alert notifications are created in the alert data composition process 1709 based on the severity classifications and types of objects in the volume. An alert message is compiled for a specific length of track. The alert message may or may not contain vegetation and object recognition information.

In the final processing step, the communications controller 1711 sends the alert messages and/or image data packets over a wireless communications system 1712. The alert messages are also optionally stored in the local storage if desired, or if wireless connections are not available. The wireless transfer of information is not an essential function and the messages may be stored locally until the unit returns to a base station and can be downloaded to fixed processing systems (e.g., desktop computer).

In a particularly advantageous embodiment, the clearance zone environment is represented by a collection of geometry and images. That is, not the geometric representation alone but also advantageously with images, such as from computer vision. While georeferencing the images could be done, this is more akin to situations where 2D overhead mapping applications are utilized. Here, obliquely acquired, near-field images are preferably used and in this case, the images are georeferenced and the pixels and objects in the images are preferably localized in space.

As explained above, the present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. An alert system for alerting railway operators of one or more obstructions in a volumetric clearance zone around a railroad track on which a railway vehicle moves, comprising:

an imaging sensor configured to capture images of an environment of the railway vehicle including the volumetric clearance zone around the railroad track on which the railway vehicle moves, the imaging sensor being configured to capture images from the railway vehicle as the railway vehicle moves on the railroad track, wherein a 3D volumetric model of the volumetric clearance zone is created for the instant in time of image capture;

a geospatial position sensor configured to determine a geolocation of the geospatial position sensor and together with computer vision as needed to thereby contribute to accurate localization of the environment imaged by the imaging sensor; and a processor coupled to the imaging sensor and geospatial position sensor, and programmed to at least:

reference the images captured by the imaging sensor to the geolocation determined by the geospatial position sensor, the geometric parameters of the imaging sensors and object properties in the images to form geospatially referenced images of the environment including the clearance zone; and for one or more geospatial images of the geospatial images;

process the one or more geospatially referenced images to produce a localized geometric computer model of the 3D volumetric environment in which objects in the environment are represented by a collection of geometry and plurality of image pixels and whole images;

detect and localize objects in the volumetric clearance zone based on the geometric computer model and the plurality of image pixels and whole images; and upload the one or more geospatial images and a notification of detected and localized objects whereupon a notification is generated and provided to the railway operator advising the operator of the location of the obstruction in the clearance zone.

2. The system of claim 1 wherein the obstruction is identified and the notification includes the identification of the obstruction.

3. The system of claim 2 wherein the obstruction is vegetation and the notification includes an identification of the type of vegetation detected in the clearance zone.

4. The system of claim 1 wherein the obstructions are observed in real time as the railway vehicle travels along the railroad track.

5. The system of claim 4 wherein the typing and location of the obstruction occur in real time, and the notification containing the location and typing of the obstruction is provided to the railway operator in real time.

6. The system of claim 5 wherein the notification is provided wirelessly.

7. The system of claim 1 wherein the notification is provided to the railway operator in the form of a composite image that includes; (i) a geospatial image that depicts the obstruction, that is overlaid with; (ii) the clearance zone, whereupon the railway operator can readily ascertain the location and size of the obstruction in the railway clearance zone.

8. The system of claim 7 wherein the notification further includes a rating of the proximity or danger of the obstruction in the clearance zone based upon its proximity to the railroad track.

9. The system of claim 8 wherein the closest proximity is labeled in a three tiered manner in which the closest proximity is labeled severe, the next closest proximity is labeled high and the furthest proximity is labeled moderate based upon criteria selected by the railway operator.

10. The system of claim 9 wherein the obstruction is vegetation and the notification includes an identification of the type of vegetation detected in the clearance zone.

11. The system of claim 1 wherein the notifications are compiled for a specific length of track.

* * * * *